INVENTOR.
ELMER RALPH WOODWARD

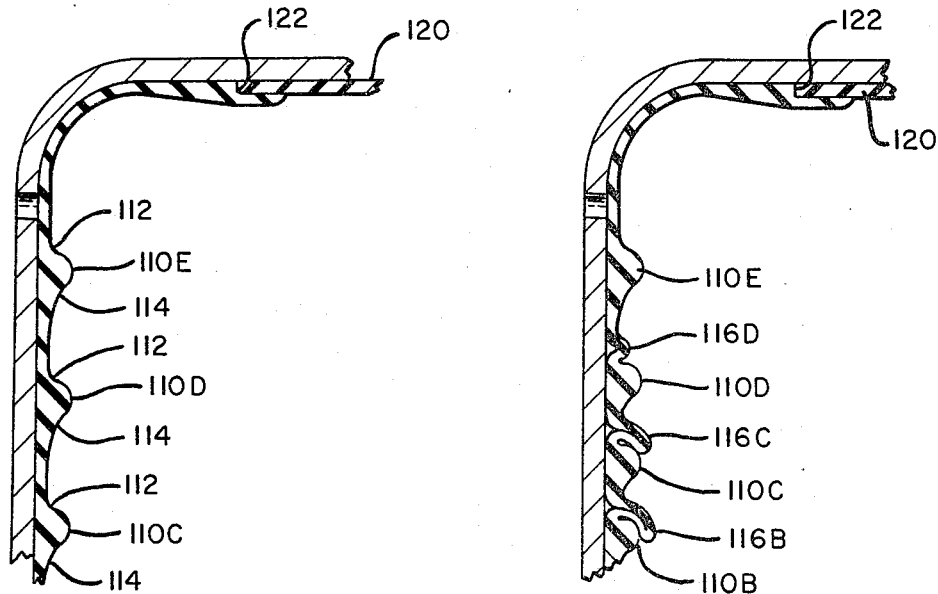
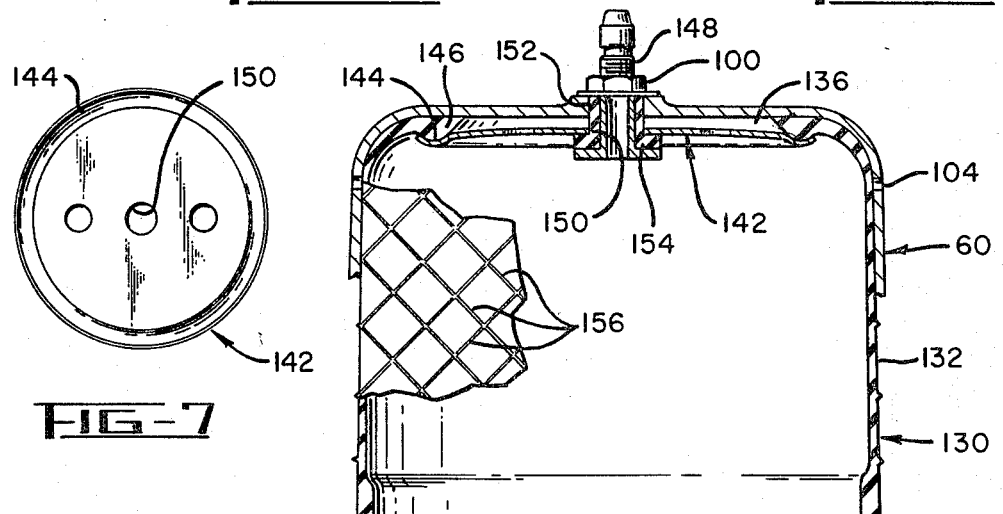
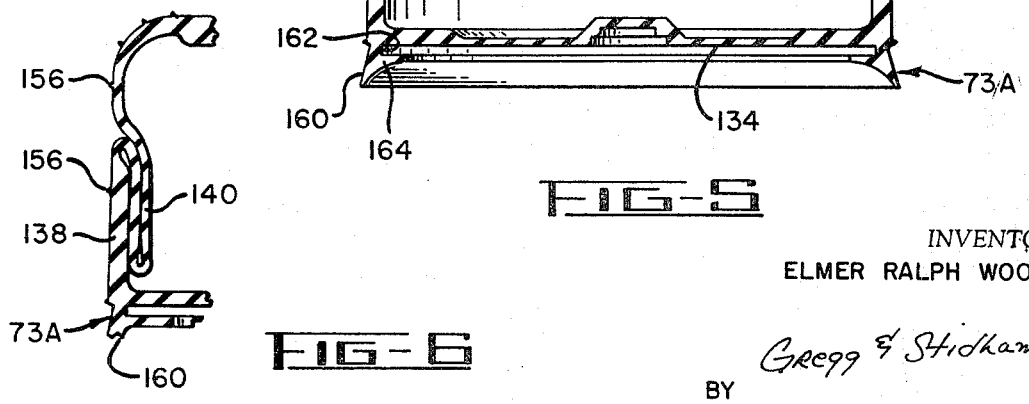
INVENTOR.
ELMER RALPH WOODWARD

United States Patent Office 3,509,795
Patented May 5, 1970

3,509,795
VEHICLE BRAKE OPERATOR
Elmer Ralph Woodward, Cloverdale, Calif., assignor to Wiz Corporation, San Francisco, Calif., a corporation of California
Filed Mar. 28, 1967, Ser. No. 626,536
Int. Cl. F01b *19/04;* F16j *3/00*
U.S. Cl. 92—92                                                4 Claims

ABSTRACT OF THE DISCLOSURE

A brake operator having a gas filled bladder at one side of a movable member operating in a housing and resiliently urging the operator into brake-applied position. The bladder is formed with one or more fold control ribs comprising a generally annular stiffening portion which remains in contact with the housing wall, and adjacent bladder portions which fold inwardly when the movable member is moved into brake-released position when fluid under pressure is supplied to the other side of the movable member.

---

This invention relates to a brake operator for vehicles such as busses, trucks, truck trailers, tractors and the like. In a copending patent application of Ernest C. Ike, Ser. No. 428,765, now Patent No. 3,431,031 filed Jan. 28, 1965 entitled "Vehicle Brake Operator" assigned to the assignee of the present invention, there is shown a novel brake operator comprising a housing with a movable member reciprocably movable therein. One end of the housing is closed and means are provided for supplying fluid under pressure to said one end to move the movable member to brake-released position. An expansible-contractible chamber filled with a compressible fluid under pressure, such as air or other gas, is loacted at the other side of the movable member to urge the operator to brake-applied position when the fluid under pressure is released from the one side of the movable member.

The expansible-contractible chamber typically comprises a pressurized bladder made of rubber or other flexible material. It is known that the strength of rubber in compression is much greater (approximately 10 times greater) than the strength of rubber in tension. Similarly, the life of an inflated bladder which is distended during operation is less than that of one which is not so distended, or which is distended to a lesser extent.

An object of this invention is the provision of a brake operator with an inflated gas bladder at one side of a movable member for moving the same to brake-applied position when pressure at the other side of the movable member is reduced to a predetermined amount, which bladder remains in compression and is not distended in the brake-applied position of the operator.

An object of this invention is the provision of a brake operator employing an inflatable bladder which is folded in the brake-released condition and unfolds to a substantially normal position in the brake-applied condition.

An object of this invention is the provision of an improved inflatable bladder for use in a housing for urging a movable means in one direction, which bladder is formed with fold control means to control folding of the bladder when the movable means is urged in the opposite direction.

The operator of this invention includes a housing such as a cylinder, with a movable member, such as a piston, reciprocably mounted therein. One end of the housing is closed and means are provided for supplying fluid under pressure to said one end to move the movable member toward the other end of the housing into brake-released position. A pressurized bladder is positioned in the other end of the housing and abuts the movable member to resiliently urge the same toward the one end of the housing. When the pressure in the one end of the housing is reduced below a predetermined value the movable member is moved to brake-applied position by the pressurized bladder. In accordance with this invention, when the movable member is moved to brake-released position, one or more inwardly directed folds are produced in the walls of the bladder. The fold, or folds, decrease in size when the movable member is moved to brake-applied condition by the bladder with a reduction in pressure in the one end of the housing. To facilitate folding, the bladder may be formed with one or more fold control members at the side wall thereof, such as bands or rings of increased rigidity. For example, one or more ribs or bands of increased thickness may be formed on the inside of the bladder which add to the rigidity thereof. Being stiffer than adjacent bladder portions, the ribbed portion or portions of the bladder remain in engagement with the inside of the housing as the bladder is compressed by the movement of the movable member to brake-released condition for the production of an inwardly directed fold or folds in the adjacent bladder portions.

The above and other objects and advantages will be apparent from the following description when taken in conjunction with the accompanying drawings. In the drawings, wherein like reference characters refer to the same parts in the several views:

FIGURE 3 is an enlarged fragmentary sectional view of the inflatable bladder in the unfolded condition;

FIGURE 4 is a view which is similar to FIGURE 3 but showing the bladder in folded condition;

FIGURE 5 is a side elevational view of a modified form of inflatable bladder embodying this invention, with a part of the bladder being shown broken away for clarity;

FIGURE 6 is a fragmentary sectional view of the bladder shown in FIGURE 5 showing the bladder in a folded condition; and FIGURE 7 is a reduced size plan view of the bladder sealing plate shown in FIGURE 5.

Figure 1:
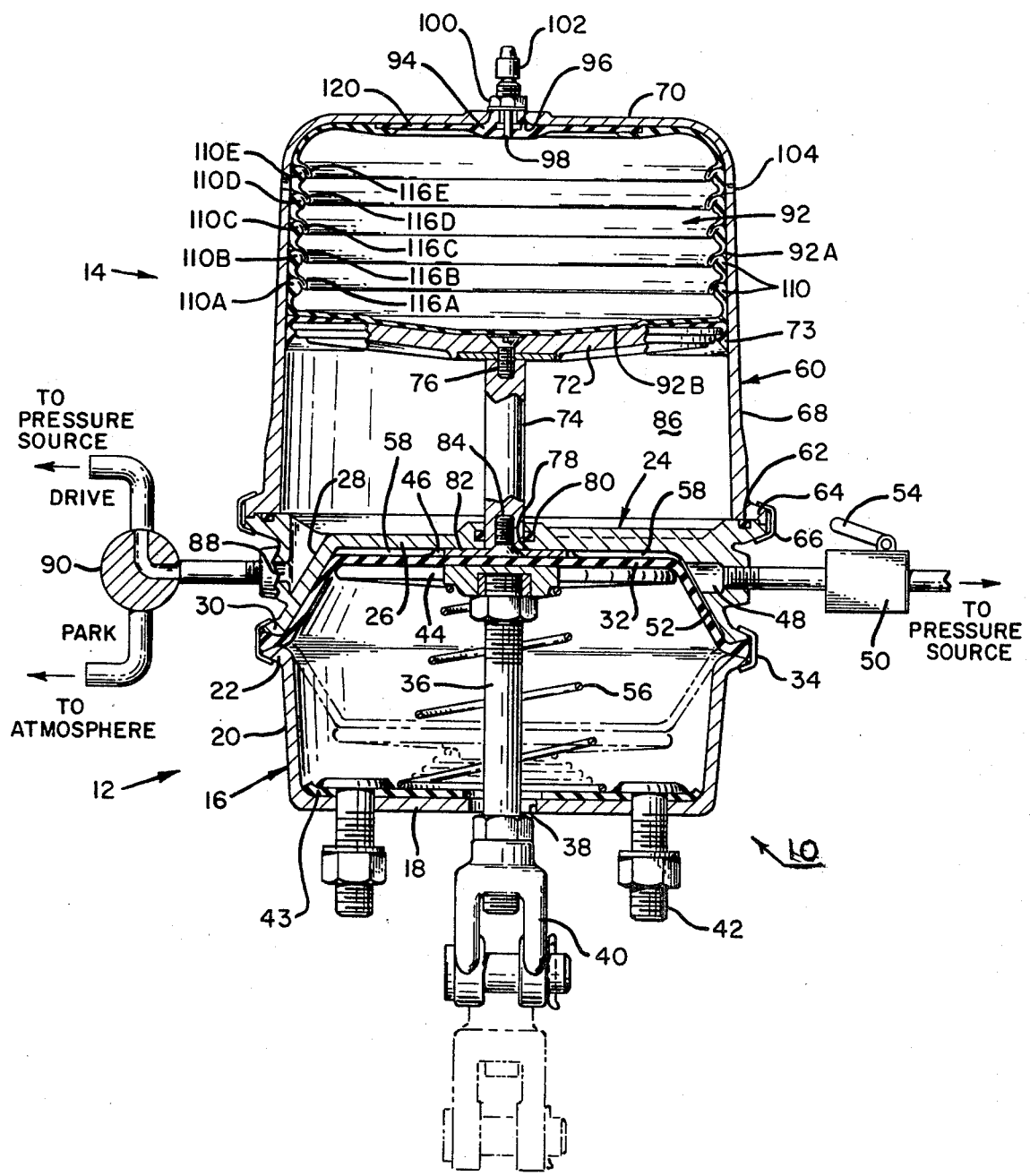
FIGURE 1 is a longitudinal cross-sectional view of a brake operating mechanism embodying this invention.

Reference is now made to FIGURE 1 of the drawings wherein there is shown a brake operator 10 comprising a service brake unit 12 and parking brake unit 14, which operator is of a type similar to that shown in the above-mentioned co-pending patent application. The service brake unit 12 includes a dish-shaped case or housing 16 comprising an outer end wall 18 and side wall portion 20 formed with a radial flange 22 at the free end thereof. The open end of the case 16 is closed by an inner wall member 24 formed with an end wall 26, side wall 28, and a radial flange 30 at the free end of the side wall. The outer rim of a flexible diaphragm 32 is clamped between the flanges 22 and 30 by use of a conventional releasable clamping ring 34.

An axially movable brake actuating rod 36 extends through a clearance hole 38 formed in the end wall 18 of the case, and the outer end of the rod is adapted for connection to a brake member such as a brake shoe at the wheel through a suitable linkage including a clevis 40. Mounting studs 42 fixedly secured to the outer end wall 18 of the case through a reinforcing plate 43 are used to attach the unit to a bracket secured to the vehicle axle adjacent the brake to be actuated. Details of the connection of the operator to the brake means of a vehicle are well known and form no part of this invention.

The inner end of the brake actuating rod 36 is threadedly secured to a cylindrical-shaped diaphragm plate 44 which, in turn, is fastened to the flexible diaphragm 32. It will be seen that an air chamber 46 is formed between the diaphragm 32 and inner wall member 24, which chamber is adapted for connection to a supply of air under pressure through a port 48 in the side wall 28 and a service brake valve 50. A groove 52 is formed in the inner tapered surface of the wall 28 for communication between the port and the inner side of the diaphragm. The valve 50 may comprise a modulating valve of conventional design which is adapted for actuation by a foot pedal 54 under control of the vehicle driver.

The space at the outer side of the diaphragm 32 is vented to the atmosphere and a light compression spring 56 between the diaphragm plate 44 and end wall 18 serves to resiliently bias the brake actuating rod 36 to the illustrated brake-released position. In order to apply the service brakes the pedal 54 is actuated to open the valve 50 for connection of the air pressure source to the chamber 46. When the chamber 46 is pressurized the diaphragm 32, together with the attached brake actuating rod 36, is moved in an outwardly direction into brake-applied position as shown in broken line view in FIGURE 1. When the air pressure is vented from the chamber 46 upon return of the valve 50 to the brake-released position, the diaphragm 32 is returned to the illustrated solid line position by the return spring 56 to release the brakes. Stop members 58 are formed on the diaphragm side of the inner end wall member 24 for engagement with the diaphragm 32 to limit the movement thereof in the brake-released direction.

The parking brake unit 14 includes a housing 60 which, in the illustrated arrangement, comprises a cylinder closed at one end thereof by the inner end wall member 24. The edge of the cylinder 60 at the lower end thereof is seated upon a seal ring 62 positioned in an annular groove in the end wall portion 26 of the wall member 24 for sealing engagement between the cylinder and end wall. A radial flange 64 is formed at the lower open end of the cylinder, and a conventional releasable clamping ring 66 secures the cylinder to the end wall member 24. Obviously, other suitable means may be used for attaching the cylinder to the inner end wall member.

The cylinder 60 is formed with a side wall portion 68 and generally flat head 70 at one end thereof. A piston 72 is reciprocably mounted in the cyilnder 60. Sealing engagement between the piston and cylinder is provided by a seal ring or band 73 formed with an annular groove at the inner wall thereof for engaging the lip, or edge, of the piston. The seal ring is made of suitable material such as rubber, plastic, or the like, to permit the ring to be stretched over the edge of the piston and into engagement therewith as illustrated. Obviously, other means may be used to provide for a slidable sealing engagement between the piston and cylinder. For example, the edge of the piston could be formed with an annular groove for the reception of a seal ring extending therefrom and engaging the cylinder wall. Obviously, the invention is not limited to any particular type seal.

A push rod 74 is attached to the piston 72 as by a screw 76 which extends through a central countersunk hole in the piston and threadedly engages the end of the push rod. The push rod extends through a central aperture 78 formed in the end of the inner end wall 24, and a seal ring 80 in a groove in the aperture provides a fluid tight seal between the wall and push rod.

A pusher plate 82 in the form of a disc is secured by a screw 84 to the end of the push rod 74 within the chamber 46. When the piston 72 is actuated to the opposite end of the cylinder in the position illustrated in FIGURE 2, the pusher plate 82 engages the diaphragm 32 to move the same and the attached brake actuating rod 36 downwardly into brake-applied position.

A chamber 86 is formed in the cylinder 60 between the piston 72 and the inner wall member 24, and the parking brake device 14 is normally maintained in the inoperative position illustrated in FIGURE 1 by application of fluid under pressure to said chamber through a port 88 in the wall member 24 through a parking brake valve 90. In the "drive" position of the valve illustrated in FIGURE 1 a fluid (e.g., air) under pressure is supplied to the chamber 86 for actuation of the piston to the position shown in FIGURE 1. Upon actuation of the valve 90 to the opposite or "park" position, the chamber 86 is vented to the atmosphere through the valve whereupon the piston 72 is moved to brake actuated position illustrated in FIGURE 2.

Movement of the piston 72 into the brake actuated position is accomplished by means of a pressurized bag or bladder 92 of novel construction. The bladder 92 is positioned within the cylinder 60 at the side of the piston 72 opposite the chamber 86. The illustrated bladder, which will be described in greater detail hereinbelow, is formed with a neck or protuberance 94 at the upper end thereof which extends through an aperture 96 in the end of the cylinder head 70. A tubular stem 98 extends through the neck 94 within which a one-way valve, not shown, is located. The stem may be externally threaded to receive a retaining nut 100 and dustcap 102. With the dustcap 102 removed, the bladder may be inflated through the hollow stem and one-way valve contained therein.

Figure 2:
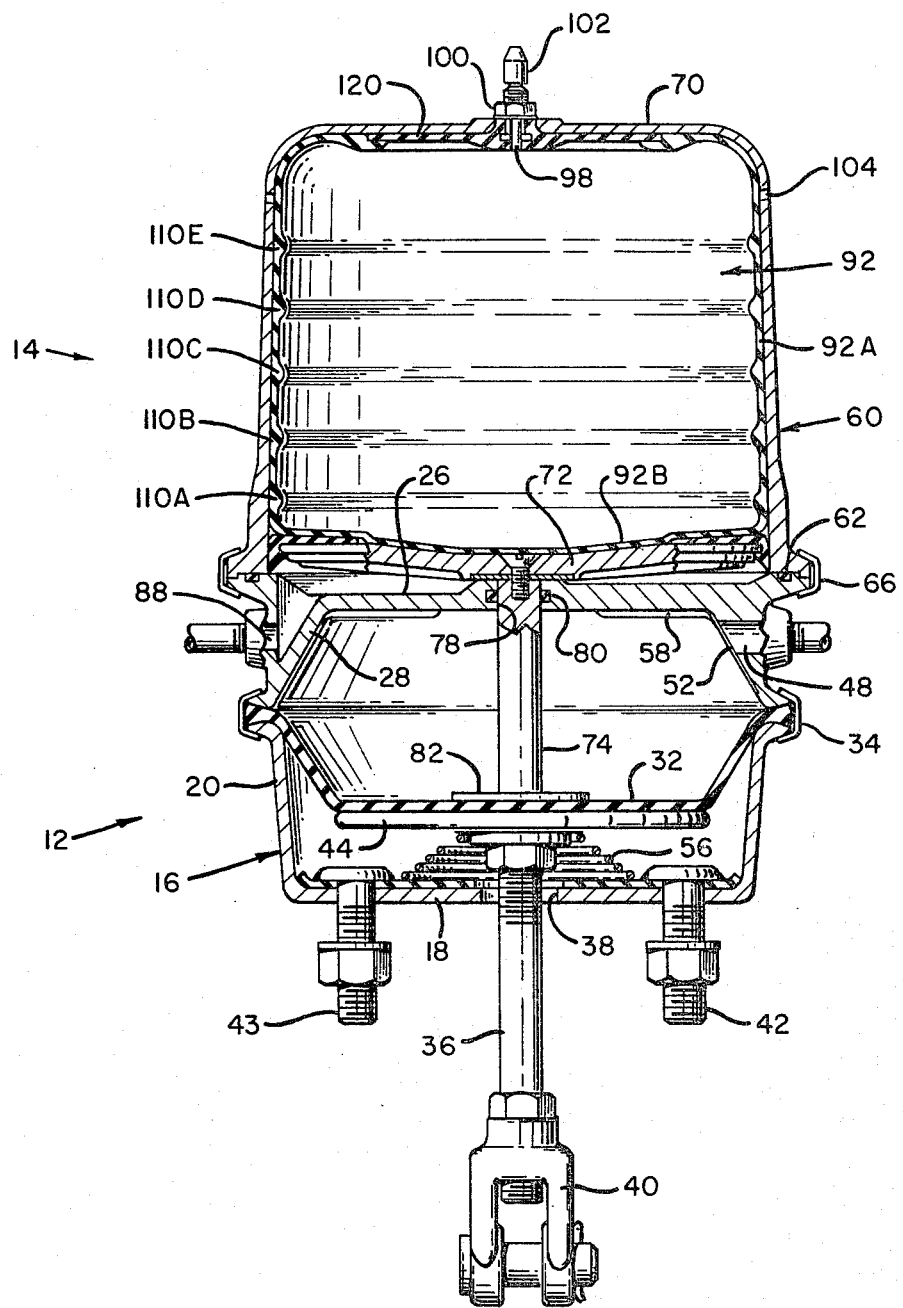
FIGURE 2 is a view which is similar to FIGURE 1 but showing the device in brake-applied condition by actuation of the parking brake unit.

In practice the valve 90 is opened to vent the chamber 86 to the atmosphere and the bladder 92 is inflated to force the piston 72 downwardly into the position shown in FIGURE 2 for application of the brake. The bladder is inflated to a pressure required to provide the desired brake-applied pressure. In one arrangement the bladder is inflated to a pressure of about 40 p.s.i. in the piston extended position illustrated in FIGURE 2. After inflation, the cap 102 may be replaced. The piston 72 is moved from the brake-applied position shown in FIGURE 2 to the brake-released position shown in FIGURE 1 by connection of the chamber 86 to the pressure supply source through the valve 90. This source may be at a pressure of, say, 150 p.s.i. When the bladder 92 is compressed at the end of the piston stroke the bladder pressure may rise to, say, about 80 p.s.i. Under these conditions a pressure differential of about 70 p.s.i. exists between the opposite sides of the piston 72. The seal ring 73 prevents leakage of air from the chamber 86 to the top of the piston to prevent actuation of the piston into brake-applied position. Even if leakage does occur past the seal ring 73 there will be no build up of pressure at the upper face of the piston because of the presence of vent holes 104 in the cylinder wall 68 adjacent the end wall 70. Consequently, pressure buildup inside the housing or cylinder 60 adjacent the bladder 92 is prevented by the inclusion of the vent holes 104 in the housing through which such air under pressure is vented. In addition to leakage past the seal ring 73, a leak in the bladder 92 could result in air pressure buildup within the housing 60 if no vent holes were included. It will be seen, then, that the same vent holes 104 prevent such a pressure buildup from occurring with leakage of the bladder.

The bladder 92 comprises a container which includes a generally cylindrical shaped side wall 92A closed by an end wall 92B which abuts the piston 72. It is made of a suitable flexible non-porous material such as rubber, or the like. As mentioned above, materials such as rubber have much greater strength in compression than in tension, and consequently have a greater operating life when not subjected to tension during use. In accordance with this invention the bladder 92 is of such a size and configuration to be in an undistended condition at both the brake-actuated and brake-released position of the piston. This is accomplished by providing for one or more folded portions in the bladder in the compressed condition thereof as illustrated in FIGURE 1. In the expanded bladder condition illustrated in FIGURE 2, the bladder is in a substantially unstretched or undistended condition, and at no point in the operating cycle is the bladder stretched.

To facilitate folding of the bladder in the brake-released condition, the bladder is provided with one or more fold control members, five such members 110A–110E being shown in the bladder of FIGURES 1 and 2. Each fold control member comprises a ring or band of increased stiffness or rigidity adjacent a flexible bladder portion. In the arrangement illustrated in FIGURES 1–4 the fold control members comprise annular ribs formed within the bladder at the side wall thereof. The wall sections of increased thickness provide added rigidity thereat. In use, the wall sections of the bladder at the ribs remain in engagement with the cylinder wall, whereas the more flexible bladder portions adjacent thereto are folded inwardly when the bladder is compressed.

Reference is made to FIGURE 3 wherein the bladder is shown in extended condition. The shape of the ribs is not particularly critical so long as the bladder is folded without stretching or damage when the bladder is compressed. In the illustrated arrangement the ribs are of asymmetrical, transverse cross-sectional shape with the upper face designated 112 of the ribs forming a greater angle with the bladder side wall than the lower face, designated 114. The side wall of the bladder, therefore, is of minimum thickness (and greater flexibility), adjacent the upper edge of each rib. In use, when the piston 72 is raised to compress the bladder, the minimum thickness areas above the fold control ribs are wedged inwardly to form the folded sections designated 116A through 116E as seen in FIGURE 1. The folds are formed consecutively, starting at the lower end of the bladder, as the piston is moved from the extended position of FIGURE 2 to the retracted position of FIGURE 1. In the fragmentary sectional view of FIGURE 4, the bladder is shown in an intermediate position between extended and compressed conditions, in which position the folds 116A, 116B and 116C are formed (fold 116A not being shown), fold 116D is in the process of being formed, and folding above the rib 110E has not started. Folding commences immediately above the lowermost rib and continues until the next higher adjacent rib prevents further folding thereat as the piston moves upwardly. At this point a fold is started above the next higher adjacent rib. In this manner the folds are formed in sequence as the bladder is compressed.

As mentioned above, a major advantage in folding the bladder in the compressed condition is the elimination of the stretching thereof in the extended condition. The shape of the bladder in the extended condition shown in FIGURE 2 is substantially the normal shape of the bladder as molded. Consequently, the bladder is not distended during use, in either the compressed or extended condition.

In use, a suitable lubricant is provided on the bladder to minimize frictional engagement between the bladder and housing or cylinder as the bladder slides therealong and the folds are formed. Also, to facilitate manufacture, the bladder may be formed in sections. In the arrangement illustrated in FIGURES 1–4, the bladder is formed with a separate cover section designated 120 on which the neck 94 is formed. A flange opening 122 is formed at the top of the bladder which is closed by the cover section 120 which is cemented or otherwise suitably secured thereto.

Other forms of fold control members may be used in accordance with this invention. For example, instead of ribs, the bladder may be formed with one or more rings of increased rigidity in the side wall thereof. Such rings may be formed of rubber having less flexibility than the bladder portion adjacent thereto. Alternatively, stiffening rings of metal or other suitable material could be embedded in the bladder wall.

Reference is now made to FIGURES 5 and 6 wherein a modified form of bladder 130 having a single fold control member is shown. The bladder is adapted for use with a brake operator having a piston and cylinder arrangement of the type shown in FIGURES 1 and 2, only a fragmentary portion of the upper end of a cylinder 60 being shown in FIGURE 5. The bladder 130 is in the form of a cylindrical wall 132 closed at one end 134 and formed with an opening 136 at the other end. The bladder wall is provided with a single fold control member 138 at the inner wall surface in the form of an increased thickness section adjacent the closed end 134. As with the ribs 110A–110E, the bladder at the section 138 remains in contact with the cylinder wall as the piston is moved to the brake-released position. In the brake-released position, the bladder is in a compressed condition, as shown in FIGURE 6, wherein a folded section 140 is shown formed adjacent the rib or fold control member 138. The rib 138 is of sufficient length to accommodate the full length of the fold in the fully compressed condition. The bladder as viewed in FIGURE 5 is of a size to substantially fill the cylinder with the piston in the brake-applied condition. Consequently, the inflated bladder is not distended when the operator is in the brake-applied position.

The bladder 130 may be provided with a cover portion, not shown, similar to the cover 120 shown in FIGURES 1 to 4, having a neck and tubular stem for inflating the same. Alternatively, the bladder may be used without such cover, in which case a clamping member 142 may be included to clamp the bladder to the housing 60 to provide a sealing engagement between the bladder and housing adjacent the opening 136 in the bladder. In the illustrated arrangement the clamping member 142 is in the form of a circular plate or disc, as seen in FIGURE 7, formed with a depression 144 adjacent the outer edge in which the bead 146 at the opening 136 is adapted to seat. A valve stem 148 extends through the apertures 150 and 152 in the plate 142 and cylinder 60, respectively, and is secured thereto by the locking nut 100. When the nut is tightened, the bladder is tightly clamped to the cylinder along the bead 141, and the resilient washer-like member 154 of the stem is compressed to expand the same to provide a sealing engagement between the stem and cylinder at the aperature 152.

Sliding of the bladder along the walls of the cylinder may be facilitated by the inclusion of small protuberances or ribs formed on the outside surface thereof. In FIGURES 5 and 6 ribs 156 which form a criss-cross pattern on the outer surface of the bladder are shown. In addition to reducing the sliding friction, the depressions formed between ribs serve to contain a lubricant, not shown. Both liquid and powder rubber lubricants are well known and need not be described in detail.

Another novel feature of the bladder 130 is the integral formation of a seal ring 72A at one end thereof. The seal 73A is similar to the seal 73 shown in FIGURES 1 and 2, except that the seal 73A is integrally formed with the bladder, rather than formed separately therefrom. As seen in FIGURES 5 and 6, the seal 73A includes an outwardly flared skirt 160 which slidably engages the inner wall of the cylinder. Also, an annular groove 162 is formed between the bottom 134 of the bladder and an inwardly directed flange 164 on the seal for reception of the edge of a piston (not shown in FIGURES 5 and 6). The seal is attached to the piston by stretching the same over the edge of the piston.

I claim:
1. A brake operator for actuation of vehicle brake means between brake-applied and brake-released conditions, said operator comprising:
   a cylinder having a closed end,
   a member reciprocally movable within said cylinder,
   means for connecting said member to said vehicle brake means for actuation thereof,
   an inflatable bladder within said cylinder between the closed end thereof and said movable member and having a size sufficient to maintain the bladder in unstretched condition in the cylinder at all positions of said movable member, gas under pressure within the bladder and urging the bladder snugly against the cylinder and movable member at all positions of the movable member within said cylinder, said gas under pressure urging said member in one direction for application of said brake means, and means for introducing fluid under pressure to the other side of said member to move the same in the direction for release of said brake means, said bladder being sealed during use thereof and being slidable along the cylinder to partially collapse by forming at least one inwardly directed fold of progressively increasing size as the movable member moves from brake-applied to brake-released positions.

2. The brake operator as defined in claim 1 wherein said bladder includes a plurality of spaced annular fold control members of increased rigidity adjacent to which inwardly directed folds are formed in succession during sliding movement of the bladder along the cylinder as the movable member moves from said brake-applied to brake-released position.

3. A piston operator comprising
means defining a cylinder having a closed end,
a piston reciprocally movable within said cylinder,
an inflatable bladder disposed within said cylinder between the closed end thereof and said piston,
gas under pressure within said bladder and urging the bladder against the cylinder and piston at all piston positions, and
means for driving the piston toward the closed cylinder end to further compress the bladder,
said bladder including at least one annular fold control member of increased rigidity adjacent to which an inwardly directed fold is formed as the bladder is further compressed and said bladder being in an undistended condition in all positions of the piston within the cylinder.

4. A piston operator comprising,
a cylinder having a closed end,
a piston reciprocally movable in the cylinder,
an inflatable bladder within said cylinder between the closed end thereof and said piston,
gas under pressure within the bladder and maintaining the bladder at greater than atmospheric pressure in all positions of the movable piston for continuously urging said piston toward the closed end of the cylinder, and
means for driving the piston in the direction of the bladder to compress the bladder,
said bladder comprising a container of flexible material which is in a substantially undistended condition in all positions of the movable piston and said bladder having a smooth outer surface adjacent said cylinder wall and spaced annular inward projections thereabout of greater thickness than intervening portions, whereby reciprocation of said piston in said cylinder to further compress said bladder causes said annular thickened portions to slide along said cylinder walls and inwardly fold the intervening portions of the bladder.

References Cited

UNITED STATES PATENTS

| | | | |
|---|---|---|---|
| 2,862,477 | 12/1958 | Ayers | 92—40 |
| 3,166,658 | 1/1965 | Jennings | 92—34 |
| 3,229,590 | 1/1966 | Huska | 92—48 |
| 3,313,319 | 4/1967 | Osborn et al. | 92—34 |
| 2,479,454 | 8/1949 | Annin | 92—13 X |
| 3,431,031 | 3/1969 | Ike | 92—92 |

FOREIGN PATENTS

| | | |
|---|---|---|
| 204,098 | 9/1923 | Great Britain. |
| 461,562 | 1/1951 | Italy. |
| 1,033,165 | 7/1958 | Germany. |
| 1,168,581 | 9/1958 | France. |

PAUL E. MASLOUSKY, Primary Examiner

U.S. Cl. X.R.

92—48, 63, 64, 134